US009621521B2

(12) United States Patent
Davydov

(10) Patent No.: US 9,621,521 B2
(45) Date of Patent: Apr. 11, 2017

(54) RAPID DATA ENCRYPTION AND DECRYPTION FOR SECURE COMMUNICATION OVER OPEN CHANNELS WITH PLAUSIBLE DENIABILITY

(71) Applicant: Empire Technology Development LLC, Wilmington, DE (US)

(72) Inventor: Alexander Y Davydov, Rockville, MD (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/796,238

(22) Filed: Jul. 10, 2015

(65) Prior Publication Data

US 2016/0021071 A1 Jan. 21, 2016

Related U.S. Application Data

(63) Continuation of application No. 14/127,969, filed as application No. PCT/US2013/039876 on May 7, 2013, now Pat. No. 9,137,011.

(51) Int. Cl.
*H04L 9/00* (2006.01)
*H04L 29/06* (2006.01)
(Continued)

(52) U.S. Cl.
CPC ........ *H04L 63/0428* (2013.01); *G06F 21/606* (2013.01); *H04L 9/06* (2013.01);
(Continued)

(58) Field of Classification Search
CPC combination set(s) only.
See application file for complete search history.

(56) References Cited

U.S. PATENT DOCUMENTS 4,760,600 A 7/1988 Nakai
8,279,781 B2 10/2012 Lucani et al.
(Continued)

OTHER PUBLICATIONS

Canetti, R., "Deniable Encryption," Lecture Notes in Computer Science, vol. 1294, pp. 90-104 (1997).
(Continued)

*Primary Examiner* — Ghazal Shehni
(74) *Attorney, Agent, or Firm* — Turk IP Law, LLC

(57) ABSTRACT

Technologies are generally described for providing rapid data encryption and decryption for secure communication over an open channel with plausible deniability. In some examples, a single bit of information may be encoded by many alternative combinations of bits thus providing high security as well as enabling a single ciphertext to encrypt several different plaintexts of the same length simultaneously. The ability to encrypt several different plaintexts of the same length simultaneously may allow plausible deniability of messages. Encryption speed may be enhanced through accumulation of useful bit sets with desired properties in advance for later use. When the need arises, several plaintexts of the same size may be encrypted into a single ciphertext using accumulated bit combinations corresponding to different secret keys.

22 Claims, 6 Drawing Sheets

(51) Int. Cl.
  *H04L 9/08*   (2006.01)
  *H04L 9/06*   (2006.01)
  *G06F 21/60*   (2013.01)

(52) U.S. Cl.
  CPC .......... *H04L 9/0618* (2013.01); *H04L 9/0838* (2013.01); *H04L 63/0435* (2013.01); *G06F 2221/2107* (2013.01)

(56) References Cited

U.S. PATENT DOCUMENTS

| | | | |
|---|---|---|---|
| 2005/0141718 A1* | 6/2005 | Yu | H04L 9/0894 380/277 |
| 2006/0227974 A1 | 10/2006 | Haraszti | |
| 2008/0101414 A1 | 5/2008 | Zhang | |
| 2012/0278609 A1* | 11/2012 | Camenisch | H04L 9/3073 713/150 |
| 2013/0151540 A1 | 6/2013 | Pathak et al. | |

OTHER PUBLICATIONS

Goldwasser, S., and Micali, S., "Probabilistic Encryption," Journal of Computer and Systems Sciences, vol. 28, No. 2, pp. 270-299, Academic Press, Inc. (1984).
International Search Report with Written Opinion for International Application No. PCT/US2013/039876 mailed on Nov. 1, 2013.
Myers, S., and Shelat, A., "Bit encryption is complete," 50th Annual IEEE Symposium on Foundations of Computer Science, pp. 607-616 (2009).

* cited by examiner

RAPID DATA ENCRYPTION AND DECRYPTION FOR SECURE COMMUNICATION OVER OPEN CHANNELS WITH PLAUSIBLE DENIABILITY

CROSS-REFERENCE TO RELATED APPLICATIONS

This application is a continuation under 35 U.S.C. §120 of U.S. patent application Ser. No. 14/127,969 filed on Dec. 19, 2013, now U.S. Pat. No. 9,137,011, which is a national stage filing under 35 U.S.C. §371 of International Application No. PCT/US13/39876 filed on May 7, 2013. The disclosure of the U.S. patent application and the International Application is hereby incorporated by reference in its entirety.

BACKGROUND

Unless otherwise indicated herein, the materials described in this section are not prior art to the claims in this application and are not admitted to be prior art by inclusion in this section.

The anticipated widespread adoption of ubiquitous computing services in the near future may rely on the confidence of users that their privacy and security are assured. However, privacy and security may cost significantly in terms of complexity of communication protocol, computational intensity of encryption/decryption algorithms on the user's side, and time. To be cost-effective, the ubiquitous computing services may need new fast, computationally efficient, and robust means to communicate with each other securely and privately.

Conventional data encryption methods may be divided into two categories: symmetrical and asymmetrical. In symmetrical methods, the same key is used both for encryption and for decryption. Asymmetrical methods may have two different keys, of which one may be used for encryption and the other for decryption. The encryption key may be available to the public, whereas the decryption key may be kept secret.

A majority of encryption techniques may include two building blocks: substitution and transposition. Substitution includes replacement of an element of the plaintext with an element of ciphertext. Ciphertext is encrypted or encoded information, which contains a form of the original plaintext that is unreadable by a human or computer without the proper cipher to decrypt. Transposition includes rearranging an order of appearance of the elements of the plaintext.

SUMMARY

The present disclosure generally describes techniques for providing rapid data encryption and decryption for secure communication with plausible deniability.

According to some examples, methods for secure communication with plausible deniability are described. An example method may include receiving a textual message to be encrypted; transforming the message to a binary format; for each bit of the transformed message, generating a random vector of integers such that a projection of the vector onto a secret key maps to a value of the bit; and/or transmitting a random vector for each bit of the transformed message to a recipient.

According to other examples, a computing device operable to provide a secure communication with plausible deniability is described. An example computing device may include a memory configured to store instructions, a communication module configured to communicate with one or more computing devices over an open communication channel, and a processing module. The processing module may receive a textual message to be encrypted, transform the message to a binary format, for each bit of the transformed message, generate a random vector of integers such that a projection of the vector onto a secret key maps to a value of the bit, and transmit a random vector for each bit of the transformed message to a recipient using one of the one or more computing devices.

According to some examples, a computer readable storage medium with instructions stored thereon, which when executed on one or more computing devices execute a method for providing rapid data encryption and decryption for secure communication with plausible deniability, is described. An example method may include the actions described above.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
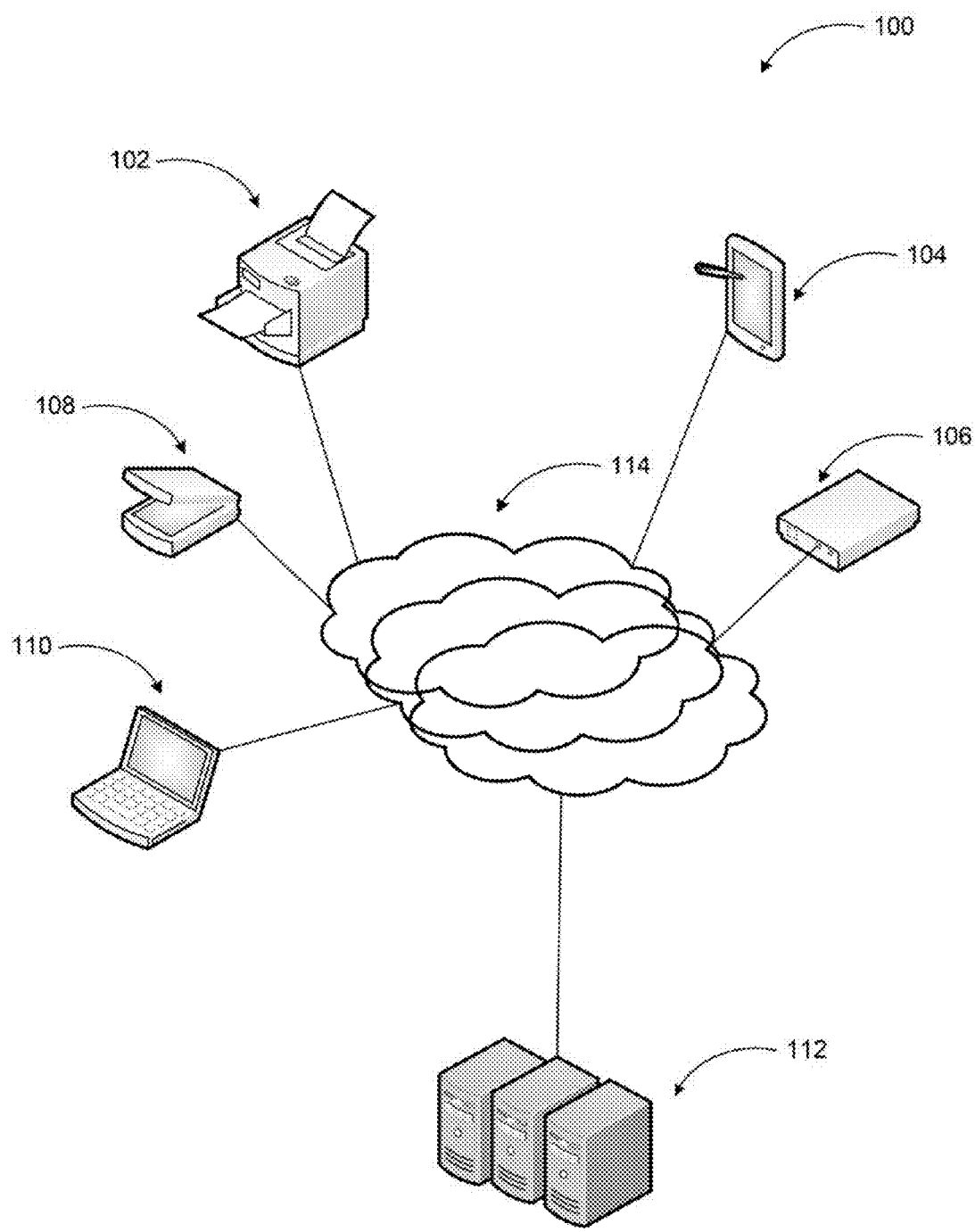
FIG. 1 illustrates an example communication environment where rapid data encryption and decryption for secure communication with plausible deniability may be implemented.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and/or computer program products related to providing rapid data encryption and decryption for secure communication with plausible deniability.

Briefly stated, technologies are generally described for providing rapid data encryption and decryption for secure communication over an open channel with plausible deniability. In some examples, a single bit of information may be encoded by many alternative combinations of bits, thus providing high security as well as enabling a single ciphertext to encrypt several different plaintexts of the same length simultaneously. The ability to encrypt several different plaintexts of the same length simultaneously may allow plausible deniability of messages. Encryption speed may be enhanced through accumulation of useful bit sets with desired properties in advance for later use. When the need arises, several plaintexts of the same size may be encrypted into a single ciphertext using accumulated bit combinations corresponding to different secret keys.

FIG. 1 illustrates an example communication environment where rapid data encryption and decryption for secure communication with plausible deniability may be implemented, arranged in accordance with at least some embodiments described herein.

As shown in a diagram 100, a networked communication environment may enable a multitude of computing devices with a variety of functions and purposes to communicate over one or more networks 114. Example devices may include a multi-function printer device 102, a handheld computing device 104, a controller 106 (e.g., security monitoring system controller), a scanner 108, a laptop computer 110, and comparable other devices.

While some communication may be over secure channels such as restricted access private networks, others may be over open channels. Moreover, multiple channels may be used for communication between two devices, where some of the utilized channels may be secure and others may be open. In some scenarios, communications may be managed/facilitated centrally by one or more servers 112. In other scenarios, the communications may be peer-to-peer without central oversight. In cases where the communication is over open channels, the communicating parties may wish to secure their exchange through encryption.

In cryptography and steganography, plausibly deniable encryption is encryption that allows its users to convincingly deny that some specific encrypted data exists, that a given piece of data is encrypted, or that they are able to decrypt a given piece of encrypted data. Such denials may or may not be genuine. For example, although suspicions may exist that the data is encrypted, it may be impossible to prove use of encryption without the cooperation of the users. If the data is encrypted, the users may not be able to decrypt it. Deniable encryption may serve to undermine an attacker's confidence either that data is encrypted, or that the person in possession of the data can decrypt it and provide the associated plaintext.

Ciphertexts may decrypt to a single plaintext and once decrypted, the encrypting user may not be able to claim that he encrypted a different message. Deniable encryption allows its users to decrypt the ciphertext to produce a different (plausible) plaintext and insist that it is what they encrypted. The holder of the ciphertext may not have the means to differentiate between the true plaintext, and the fake plaintext.

Communication systems using encryption techniques according to some embodiments may provide robust and secure communication between two or more parties through an open channel with the transferred data potentially accessible to a third party for analysis.

Figure 2:
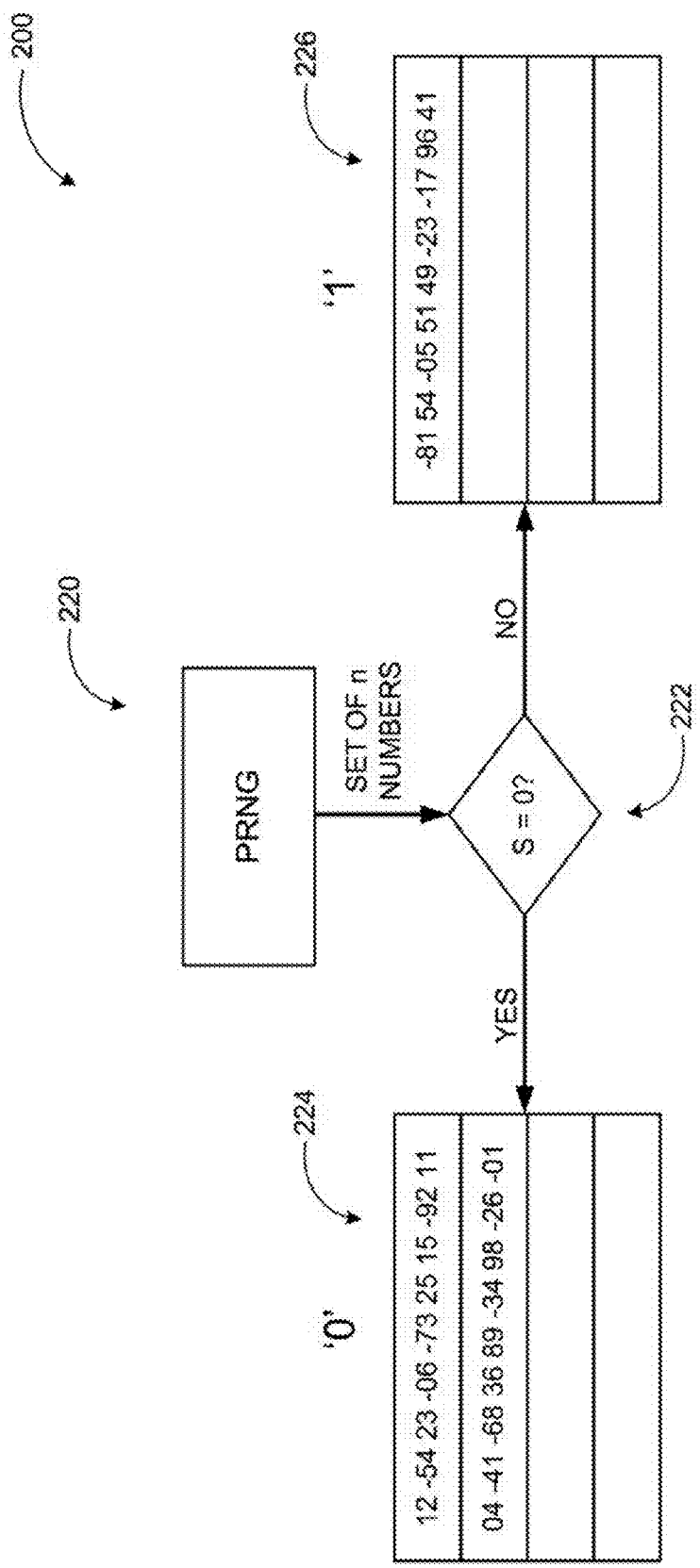
FIG. 2 illustrates conceptually a scheme of filling up two queues corresponding to bit '0' and '1', respectively.

FIG. 2 illustrates conceptually a scheme of filling up two queues corresponding to bit '0' and '1', respectively, arranged in accordance with at least some embodiments described herein.

An encryption scheme according to some embodiments belongs to the class of probabilistic encryption methods with a property that encrypting the same message (plaintext) several times may yield, with high probability, different ciphertexts. Yet another feature of an encryption scheme according to embodiments may be plausible deniability, that is, in a situation when the transmission of encrypted messages is intercepted by an adversary who may later demand the sender, or receiver, or both parties to reveal the secret key used in generating the ciphertext (thereby exposing the plaintext), the sender or receiver may generate a fake key. The fake key may make the ciphertext look like an encryption of a different plaintext of the same size, thus keeping the real plaintext private. Furthermore, the communicating parties may agree in advance upon selecting one real and several fake keys and co-encrypt the real messages with several complementary fake ones of innocent or mutually exclusive content into one ciphertext. Then, even if an adversary may manage to discover one, several, or even all keys and read the corresponding plaintexts, there may not be a way for the adversary to decide with certainty which plaintext is real and which plaintext is fake.

The deniability feature may allow a capability to securely send out meaningful messages to several recipients using a single ciphertext. The recipients may not even know about each other and hidden alternative messages but each recipient may be capable of extracting the message intended for him or her using a particular secret key. Considering an n-dimensional vector $\vec{a}=(a_1, a_2, \ldots, a_n)$ in the Euclidian space, for any vector $\vec{x}$ in the same space, a quantity S may be defined as $$S = \frac{1}{2}[\text{Sign}((\vec{a}, \vec{x})) + 1], \qquad [1]$$

where (a, x) denotes the scalar product (dot product), and the function Sign may be defined by $$\text{Sign}(y) = \begin{cases} -1, & y < 0 \\ 1, & y \geq 0. \end{cases} \qquad [2]$$

Thus, $S \in \{0, 1\}$ and is a function of $\vec{a}$ and $\vec{x}$ representing one bit of information. If both $\vec{a}$ and $\vec{x}$ are known, S may be easily determined. However, if only $\vec{x}$ is known, value of S may not be deduced. Therefore, $\vec{a}$ may be interpreted as a secret key needed to find S. There may be a multitude of vectors $\vec{x}$ that correspond to any fixed value of S for a given $\vec{a}$.

In one example scenario depicted in a diagram 200 of FIG. 2, two parties may wish to communicate securely through an open channel. They may agree beforehand upon a symmetrical secret key which may be composed of a set of integers in decimal format $\{a_i, i=1, \ldots, n\}$, with an absolute value of any element in the set being not larger than a predetermined positive integer $A_{max}$. When one of the parties wants to send a message to the other party, she may transform the plaintext into a binary string using a reversible technique such as text to ASCII to binary string. The other party may need to know this technique. For every bit of the message to be transmitted, the encrypting party may determine n integers in decimal format $\{x_i, i=1, \ldots, n\}$ generated using a pseudo-random number generator (PRNG) 220, for example. The integers may possess the following property:

If the bit to be encrypted is '0', then $S(\vec{a}, \vec{x})=0$; otherwise, $S(\vec{a}, \vec{x})=1$.

To find a set of integers with such a property, the encrypting party may run the PRNG 220 until the right combination is determined. There may be about a 50/50 likelihood that an arbitrarily selected set of numbers $\{x_i, i=1, \ldots, n\}$ yields either S=0 or S=1 for a given secret key $\vec{a}$. To speed up (quicken) the encryption process, the encrypting party may use two queues 224 and 226 to store pseudo-random number sets corresponding to '0' and '1' and fill up these queues for subsequent extraction of the appropriate number set as need arises. Thus, the number sets generated by the PRNG 220 may not be wasted. If S=0 is determined (222), the generated number set may be stored in the queue 224, otherwise the generated number set may be stored in the queue 226.

The numbers in each set may then be transformed into binary representation keeping the fixed number of bits for every integer with the account of its sign. Subsequently, the binary strings corresponding to each bit of the message to be transmitted may be concatenated into a single long binary string, which may be sent through an open channel to the receiving party. The receiving party may be able to quickly decrypt the ciphertext using their knowledge of the secret key and other details of the encryption process such as the transformation technique. Assuming the range of the numbers in the secret key is such that m bits suffice to represent any particular number of the set, the encrypting party may need to use n*m bits to encrypt a single bit of the message. A potential eavesdropper with access to the ciphertext may have difficulty trying to decrypt the message without knowledge of the secret key since every bit of the plaintext is encrypted by different bit sequence of the ciphertext with high probability.

Figure 3:
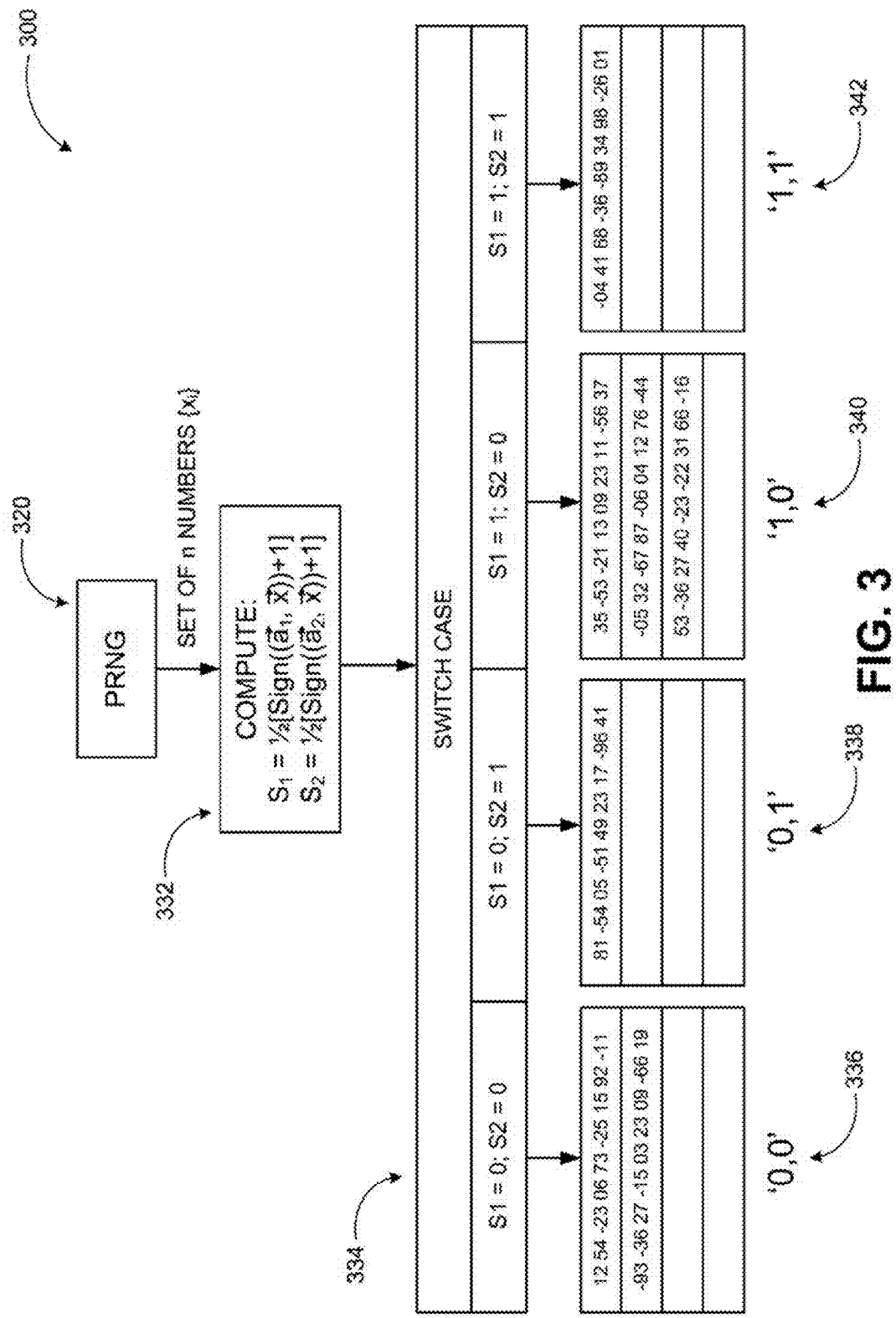
FIG. 3 illustrates conceptually another scheme of filling up four queues for use in the simultaneous encryption of two plaintexts.

FIG. 3 illustrates conceptually another scheme of filling up four queues for use in the simultaneous encryption of two plaintexts, arranged in accordance with at least some embodiments described herein.

As discussed above, an encryption technique according to some embodiments may provide plausible deniability. In an example scenario, a party communicating with another party may wish to encrypt two different plaintexts of the same size into a single ciphertext using two different secret keys. Example messages may include:
"BETWEEN SUBTLE SHADING AND THE ABSENCE OF LIGHT LIES THE NUANCE OF ILLUSION" and
"THE INTELLIGENCE GATHERING IMPLIES WORK WITH CURVED MIRRORS AND OBFUSCATION".

Each message is 75 characters long (including spaces). The plaintext messages may first be transformed into a binary format. Then, for two different secret keys $\vec{a_1}$ and $\vec{a_2}$ (non-parallel vectors), sets of numbers may be determined that simultaneously satisfy the corresponding conditions. There may be four possible pairs of bits that need to be encrypted at each instance: (0,0), (0,1), (1,0), and (1,1). The first bit in the pair may represent the bit from the binary plaintext #1, and the second one from the binary plaintext #2.

$S_1$ and $S_2$ denoting the functions defined by the Equation [1] for secret keys $\vec{a_1}$ and $\vec{a_2}$, respectively, a diagram 300 shows the streamline scheme for generating number sets and filling up the queues with desired properties for later use in the encryption. Sets of numbers ($x_i$) generated by a PRNG 320 may be used to check the predefined conditions for $S_1$ and $S_2$ as shown in a block 332. Depending on values of $S_1$ and $S_2$, generated numbers may be stored in respective storage locations (e.g., buffers) 336, 338, 340, and 342 for each bit pair (0,0; 0,1; 1,0 and 1,1). A switching block 334 may direct the generated number sets to the respective storage location.

The above-described approach for two plaintext message may be generalized for encryption of three or more plaintexts of the same size as well. Given several different secret keys, the corresponding number of queues may be generated in advance so that, when the need arises, several plaintexts of the same size can be rapidly encrypted into a single ciphertext. Moreover, plaintext messages of unequal length may be brought to the same length by adding predefined dummy characters to the shorter one(s) of the messages.

Additionally, embodiments may be implemented as part of an information distribution system with layered security where different users may have access to different amounts of information from a single encrypted message depending on their authorization level. For example, in a three-level system, users with the highest authorization level (i.e., most trusted) may know all three secret keys and be able to read all three sub-messages, while less trusted users may be able to access a portion of the distributed message in accord with their authorization level (secret keys they know).

Following is a detailed example of co-encryption of two example texts of equal lengths. If two texts are of different lengths, the shorter one may be altered to include additional spaces, exclamation marks, or similar fill-in characters to make it of the same length as the other.

Plaintext #1: Real!
Plaintext #2: Bogus

Both plaintexts are 5 characters long. The ASCII table may be used to represent the plaintexts as two sets of decimal numbers:

Plaintext #1: 82,101,97,108,33
Plaintext #2: 66,111,103,117,115

Next, each number may be transformed from the decimal format into the binary format:

Plaintext #1: 1010010,1100101,1100001,1101100,0100001
Plaintext #2: 1000010,110111,1100111,1110101,1110011.

It should be noted the in the ASCII table, the largest decimal number used is 127 which is represented in the binary format as 1111111. Thus, the communicating parties may agree on using 7 positions for each binary number (zeros may be added to the left if needed, e.g., 3 is written as 11 in the binary format and may be represented as 0000011). Then, commas may be omitted and following two strings of 'zeros' and 'ones' may be obtained to be co-encrypted simultaneously:

Plaintext #1: 10100101100101110000111011000100001

Plaintext #2: 10000101101111110011111101011110011

Two secret keys may be selected using a pseudo-random number generator or similar technique:

Key #1: $\vec{a}_1 = \{32, -5, 11, 29\}$

Key #2: $\vec{a}_2 = \{42, 23, -32, -9\}$

The condition arccos $$\left(\frac{(\vec{a}_1, \vec{a}_2)}{\|\vec{a}_1\| \cdot \|\vec{a}_2\|}\right) \neq \{0°, 180°\}$$

may be checked (meaning that vectors $\vec{a}_1$ and $\vec{a}_2$ are not collinear). Indeed, arccos $$\left(\frac{(\vec{a}_1, \vec{a}_2)}{\|\vec{a}_1\| \cdot \|\vec{a}_2\|}\right) \approx 76°$$

for the example secret keys and therefore these vectors may be utilized as independent keys.

For each pair of bits taken from Plaintext #1 and Plaintext #2 respectively (e.g., in the example, the first pair is (1,1), the second is (0,0), the third is (1,0), etc.), a corresponding 4-component vector $\vec{x}$ is sought such that the values of quantities:

$$S_1 = \frac{1}{2}[\text{Sign}((\vec{a}_1, \vec{x})) + 1]$$

and $$S_2 = \frac{1}{2}[\text{Sign}((\vec{a}_2, \vec{x})) + 1]$$

(with $$\text{Sign}(y) = \begin{cases} 1, & \text{if } y \geq 0 \\ -1, & \text{if } y < 0 \end{cases}$$

match the pair. For example, for the first pair (1,1), $\vec{x}$ is sought that yields $S_1=1$ and $S_2=1$.

To find the matching number sets, the PRNG may be run and each four consecutive numbers interpreted as vectors $\vec{x}$ computing $S_1$ and $S_2$ using the formulas above and sorting the $\vec{x}$ vectors in a corresponding section of a table with four columns (cases):

(1) $S_1=0$ and $S_2=0$; (2) $S_1=0$ and $S_2=1$; (3) $S_1=1$ and $S_2=0$; (4) $S_1=1$ and $S_2=1$.

The table may be pre-calculated in advance to have enough entries so when the vector $\vec{x}$ encrypting the desired pair of bits is needed, it can be easily extracted. Each time the very first vector in the list may be used in the corresponding section of the table and erased from the list afterwards. In some examples, a separate processor may perform the number generation and checking, thus, keeping enough entries in each section of the table. This way, co-encryption of two plaintexts may start almost instantaneously as soon as the plaintexts are prepared in the binary format.

Example columns of the table are presented below:

| Vectors $\vec{x}$ corresponding to ($S_1 = 0$) and ($S_2 = 0$): | | | |
|---|---|---|---|
| −95 | 59 | −63 | −59 |
| −70 | 32 | 28 | 56 |
| −7 | −18 | 30 | −90 |
| −62 | −7 | −19 | 54 |
| −61 | −85 | −46 | 25 |
| −51 | −74 | 9 | −37 |
| −95 | −41 | 70 | −3 |
| −61 | 64 | 23 | −92 |
| −100 | 78 | 24 | 3 |
| −93 | 56 | 29 | 8 |
| −30 | −56 | 39 | −38 |
| −40 | 9 | 98 | −10 |
| −62 | −95 | −38 | −81 |
| −88 | 31 | −62 | −95 |
| −19 | 22 | 24 | −48 |
| −29 | −10 | 21 | −44 |
| −74 | −72 | −28 | −63 |
| −13 | −25 | 51 | −16 |
| −81 | 48 | 33 | −5 |
| −4 | −64 | 23 | −59 |
| −61 | 81 | −20 | 58 |
| −62 | −56 | −19 | −98 |
| −73 | 6 | −89 | 47 |
| −95 | −8 | −57 | 53 |
| −70 | −70 | −50 | −41 |
| −89 | 95 | 31 | 65 |
| −59 | −88 | −91 | 6 |
| −44 | −34 | 35 | −61 |
| −63 | −1 | 18 | −25 |
| Vectors $\vec{x}$ corresponding to ($S_1 = 0$) and ($S_2 = 1$): | | | |
| −25 | −36 | −55 | −89 |
| 63 | 48 | −45 | −77 |
| 42 | −41 | −51 | −54 |
| 49 | −81 | −94 | −42 |
| 48 | 52 | −24 | −79 |
| −18 | 76 | −58 | −84 |
| 56 | 91 | −25 | −78 |
| 16 | 67 | −84 | −19 |
| −59 | 98 | −55 | −86 |
| 81 | 85 | −60 | −72 |
| −48 | 86 | −3 | −65 |
| 24 | 25 | −12 | −52 |
| −21 | 67 | −50 | 3 |
| 1 | −16 | 48 | −38 |
| 22 | 79 | −3 | −84 |
| −1 | 82 | −96 | 10 |
| 58 | 53 | −63 | −64 |
| 9 | 42 | −21 | 4 |
| 5 | 92 | −16 | −25 |
| 40 | 84 | −84 | −90 |
| 36 | 31 | −62 | −75 |
| 37 | −33 | 7 | −50 |
| 31 | 71 | −32 | −37 |
| Vectors $\vec{x}$ corresponding to ($S_1 = 1$) and ($S_2 = 0$): | | | |
| 50 | −78 | 20 | −10 |
| −19 | −9 | 46 | 90 |
| 31 | −62 | 95 | 61 |
| −20 | −46 | 71 | 3 |
| 10 | −41 | 72 | 1 |
| −71 | 33 | 6 | 87 |
| −33 | −72 | 94 | 15 |
| −45 | −95 | 70 | 20 |
| −4 | −83 | −79 | 84 |
| 11 | −80 | 71 | −52 |
| 46 | −27 | 72 | 12 |
| −26 | −35 | 20 | 24 |
| −3 | 67 | 43 | 30 |
| 89 | −78 | 65 | 25 |
| 27 | 13 | 84 | 57 |
| −56 | −42 | 50 | 77 |
| −31 | −47 | −89 | 68 |
| 49 | −89 | 64 | 76 |
| −20 | 33 | 67 | 34 |
| 7 | −9 | 100 | −38 |
| 25 | −41 | 92 | 14 |
| 20 | −67 | 96 | 84 |
| −23 | −23 | 5 | 29 |

-continued

| | | | |
|---|---|---|---|
| 55 | −52 | 94 | 11 |
| 35 | −48 | 61 | −21 |
| 24 | 8 | 100 | 76 |

Vectors $\vec{x}$ corresponding to ($S_1 = 1$) and ($S_2 = 1$):

| | | | |
|---|---|---|---|
| 92 | 74 | 40 | 82 |
| 70 | 10 | −67 | 54 |
| 94 | 74 | −77 | −47 |
| 42 | 88 | 87 | 47 |
| 75 | 58 | −66 | 43 |
| 57 | −20 | 52 | −24 |
| 79 | −7 | 70 | 52 |
| 89 | −1 | 22 | 51 |
| 41 | 86 | −38 | 46 |
| 75 | −5 | −6 | 35 |
| 70 | 89 | 98 | −19 |
| 89 | 80 | 46 | 55 |
| 47 | 50 | 36 | 17 |
| 79 | −3 | −74 | 98 |
| 64 | −65 | −19 | 94 |
| 86 | −34 | −99 | 89 |
| 38 | 12 | −7 | 29 |
| 62 | 21 | 0 | −27 |
| 90 | 69 | 83 | −14 |
| 63 | −69 | −81 | −47 |
| 59 | 45 | 85 | 84 |
| 39 | 65 | 37 | 0 |

Using the table, two plaintexts may be encrypted into a single ciphertext as follows: 92 74 40 82 −95 59 −63 −59 50 −78 20 −10 −70 32 28 56 −7 −18 30 −90 70 10 −67 54 −62 −7 −19 54 94 74 −77 −47 42 88 87 47 −61 −85 −46 25 −25 −36 −55 −89 75 58 −66 43 63 48 −45 −77 57 −20 52 −24 79 −7 70 52 89 −1 22 51 −51 −74 9 −37 −95 −41 70 −3 42 −41 −51 −54 49 −81 −94 −42 41 86 −38 46 75 −5 −6 35 70 89 98 −19 48 52 −24 −79 −19 −9 46 90 89 80 46 55 −61 64 23 −92 −18 76 −58 −84 56 91 −25 −78 47 50 36 17 16 67 −84 −19 −100 78 24 3 −93 56 29 8 −59 98 −55 −86 79 −3 −74 98.

Furthermore, each integer in the ciphertext may be represented in a binary format. Since numbers from the range −100 to 100 are being used, it may suffice to use 7 positions (bits) to represent the absolute value of any number. Another position (from the left) may be used to encode the sign: 0→"+" and 1→"−". Thus, 8 positions may be used for every decimal number. Then, the above ciphertext may be transformed to:
0101110001001010001010000101001011011111100111011
10111111101110110010110011
1000010100100010101100011000100000000011100001110
0010000111100100100001111101101
1010010001100000101011000011001101110101111110100
001111001001100110110010111100 1
0010101100110101011100101010010110000101011100
101111101111011010101101011110
0001100110011001101001001011011111101001011
0011101011000010001010110011111
1100110000101011011100110101100011001001001110 0
1001001100001001111100001110100
0110001101000101100110000010001011000110011101
1001111001010000100110010010111
0111110101001010001101000001100101010101010010 0110
1100111011011000110001110100 01
1101111010101010001010010101011010100110001011 0
0100101110000101100001100010 00
1101000110011001110001001001001100000110
10010011000110011110010011 1000
100100101110010110100101100101010000001011100 01
10111101111010100000000010111 11
0111001001001001001100110101110101101010100001 1100001
011011100110011100111000101111
00110010001001000001000100100100010001000111101010
01001011111001000100111000011 0
000000001111011101001110000001110100001000101110
11011000101011011111101011001 00
11111000001111001010011000 10.

Thus, starting with two plaintexts (35+35=70 bits), the encryption process results in a single ciphertext (120 bits). 1120/70=16 meaning effectively 16 bits are used to encrypt each bit. This may be compared to other techniques of co-encryption that involve thousands of bits to encrypt one bit and may be computationally intensive.

The decryption may be performed in the reverse order. For example, considering the decryption with the Key #2 ($\vec{a}_2$): (1) the binary ciphertext may be divided into chunks of 8 bits. In each such chunk, a first bit may be interpreted as a sign and the remaining seven bits as a number in binary format restoring the sequence of decimal numbers; (2) the resulting sequence may be divided in chunks of four numbers and a series of bits computed using the formula $$S_2 = \frac{1}{2}[\text{Sign}((\vec{a}_2, \vec{x})) + 1];$$

(3) the resulting binary sequence may be divided in chunks of 7 bits and each chunk may be transformed into a decimal number; and (4) the Plaintext #2 may be restored using the ASCII table.

The examples in FIGS. 1 through 3 have been described using specific systems, configuration, and processes in which rapid data encryption and decryption for secure communication with plausible deniability may be implemented. Embodiments are not limited to the systems and processes according to these examples.

Figure 4:
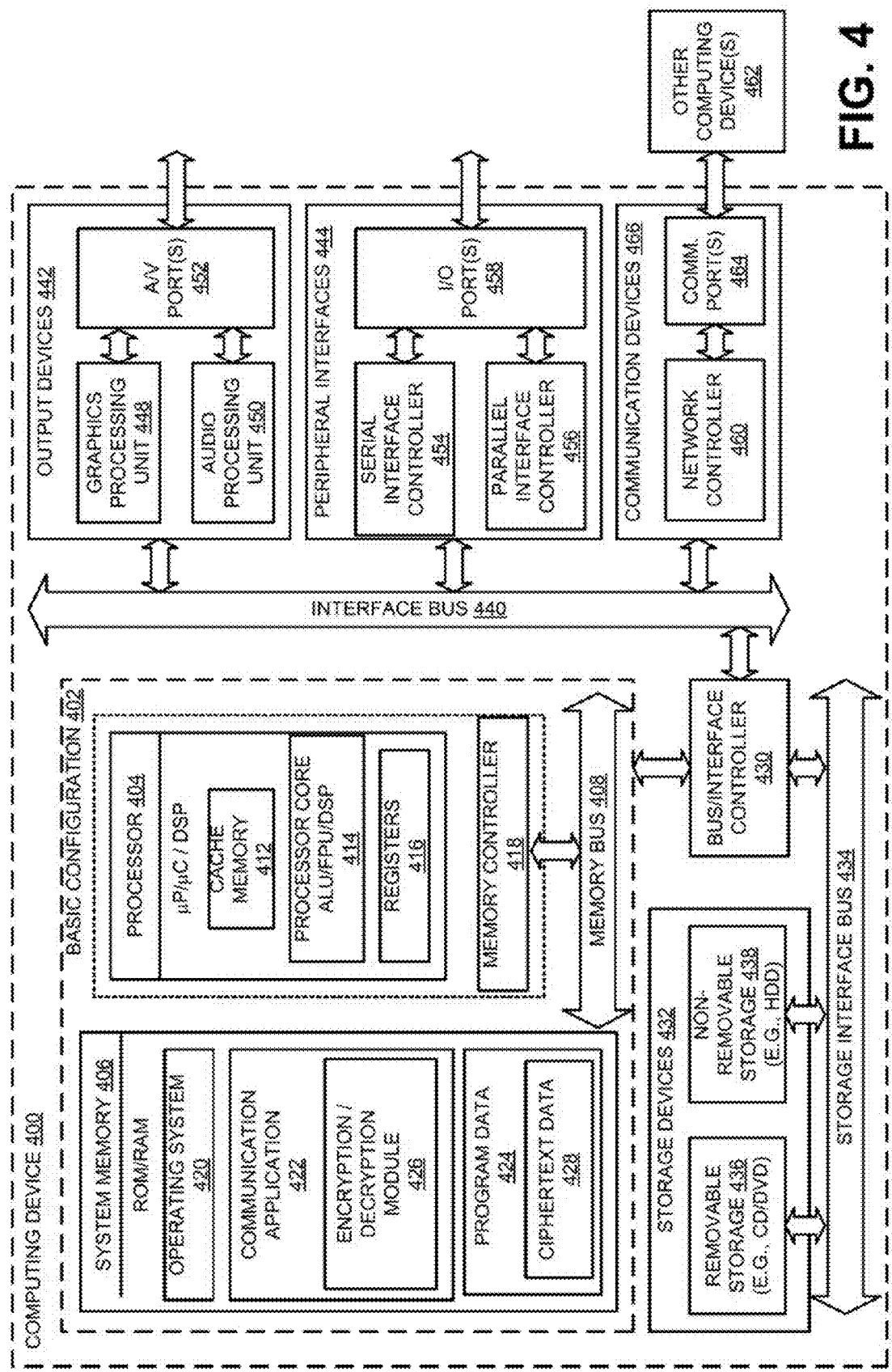
FIG. 4 illustrates a general purpose computing device, which may be used to provide rapid data encryption and decryption for secure communication with plausible deniability.

FIG. 4 illustrates a general purpose computing device 400, which may be used to provide rapid data encryption and decryption for secure communication with plausible deniability, arranged in accordance with at least some embodiments described herein.

For example, the computing device 400 may be a ubiquitous computing device communicating with other devices securely over an open channel as described herein. In one example basic configuration 402, the computing device 400 may include one or more processors 404 and a system memory 406. A memory bus 408 may be used for communicating between the processor 404 and the system memory 406. The basic configuration 402 is illustrated in FIG. 4 by those components within the inner dashed line.

Depending on the desired configuration, the processor 404 may be of any type, including but not limited to a microprocessor (μP), a microcontroller (μC), a digital signal processor (DSP), or any combination thereof. The processor 404 may include one more levels of caching, such as a cache memory 412, a processor core 414, and registers 416. The example processor core 414 may include an arithmetic logic unit (ALU), a floating point unit (FPU), a digital signal processing core (DSP Core), or any combination thereof. An example memory controller 418 may also be used with the processor 404, or in some implementations the memory controller 418 may be an internal part of the processor 404.

Depending on the desired configuration, the system memory 406 may be of any type including but not limited to volatile memory (such as RAM), non-volatile memory (such as ROM, flash memory, etc.) or any combination thereof.

The system memory 406 may include an operating system 420, a communication application 422, and program data 424. The communication application 422 may include an encryption/decryption module 426 to encode bits of information by many alternative combinations of bits thus providing high security as well as enabling a single ciphertext to encrypt several different plaintexts of the same length simultaneously. The program data 424 may include, among other data, ciphertext data 428 associated with textual data to be encrypted, or the like, as described herein.

The computing device 400 may have additional features or functionality, and additional interfaces to facilitate communications between the basic configuration 402 and any desired devices and interfaces. For example, a bus/interface controller 430 may be used to facilitate communications between the basic configuration 402 and one or more data storage devices 432 via a storage interface bus 434. The data storage devices 432 may be one or more removable storage devices 436, one or more non-removable storage devices 438, or a combination thereof. Examples of the removable storage and the non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

The system memory 406, the removable storage devices 436 and the non-removable storage devices 438 are examples of computer storage media. Computer storage media includes, but is not limited to, RAM, ROM, EEPROM, flash memory or other memory technology, CD-ROM, digital versatile disks (DVD), solid state drives, or other optical storage, magnetic cassettes, magnetic tape, magnetic disk storage or other magnetic storage devices, or any other medium which may be used to store the desired information and which may be accessed by the computing device 400. Any such computer storage media may be part of the computing device 400.

The computing device 400 may also include an interface bus 440 for facilitating communication from various interface devices (for example, one or more output devices 442, one or more peripheral interfaces 444, and one or more communication devices 466) to the basic configuration 402 via the bus/interface controller 430. Some of the example output devices 442 include a graphics processing unit 448 and an audio processing unit 450, which may be configured to communicate to various external devices such as a display or speakers via one or more A/V ports 452. One or more example peripheral interfaces 444 may include a serial interface controller 454 or a parallel interface controller 456, which may be configured to communicate with external devices such as input devices (for example, keyboard, mouse, pen, voice input device, touch input device, etc.) or other peripheral devices (for example, printer, scanner, etc.) via one or more I/O ports 458. An example communication device 466 includes a network controller 460, which may be arranged to facilitate communications with one or more other computing devices 462 over a network communication link via one or more communication ports 464. The one or more other computing devices 462 may include servers, communication equipment, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 400 may be implemented as a part of a general purpose or specialized server, mainframe, or similar computer that includes any of the above functions. The computing device 400 may also be implemented as a personal computer including both laptop computer and non-laptop computer configurations.

Example embodiments may also include methods for rapid data encryption and decryption for secure communication with plausible deniability. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be with a machine that performs a portion of the program. In other examples, the human interaction can be automated such as by pre-selected criteria that may be machine automated.

Figure 5:
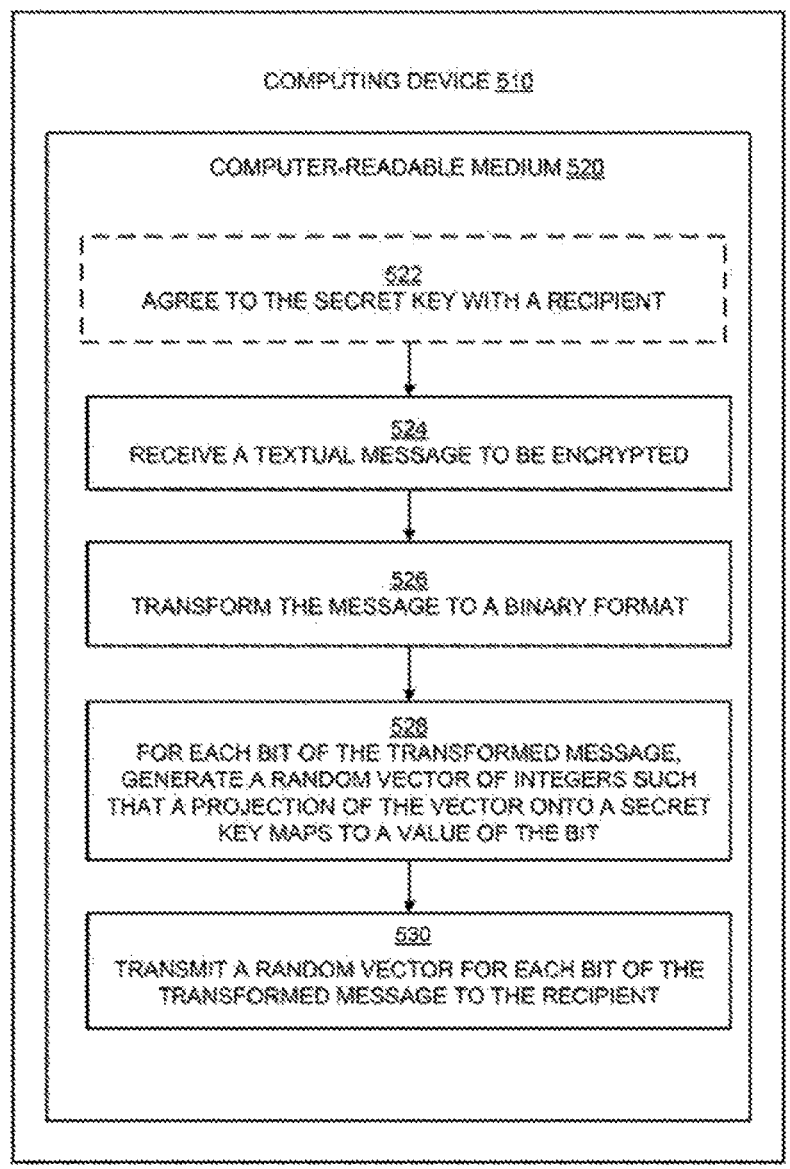
FIG. 5 is a flow diagram illustrating an example method for providing rapid data encryption and decryption for secure communication with plausible deniability that may be performed by a computing device such as the computing device in FIG. 4.

FIG. 5 is a flow diagram illustrating an example method for rapid data encryption and decryption for secure communication with plausible deniability that may be performed by a computing device such as the computing device in FIG. 4, arranged in accordance with at least some embodiments described herein.

Example methods may include one or more operations, functions or actions as illustrated by one or more of blocks 522, 524, 526, 528, and 530, and may in some embodiments be performed by a computing device such as the computing device 400 in FIG. 4. The operations described in the blocks 522-530 may also be stored as computer-executable instructions in a computer-readable medium such as a computer-readable medium 520 of a computing device 510.

An example process for rapid data encryption and decryption for secure communication with plausible deniability may begin with optional block 522, "AGREE TO THE SECRET KEY WITH A RECIPIENT", where the communicating parties (or their devices such as laptop 110 and scanner 108 of FIG. 1) may agree on a secret key.

Optional block 522 may be followed by block 524, "RECEIVE A TEXTUAL MESSAGE TO BE ENCRYPTED", where the encryption/decryption module 426 may receive the plaintext message to be encrypted prior to transmission over the open channel.

Block 524 may be followed by block 526, "TRANSFORM THE MESSAGE TO A BINARY FORMAT", where the encryption/decryption module 426 may transform the plaintext message into binary format through a variety of techniques, for example, using an ASCII table.

Block 526 may be followed by block 528, "FOR EACH BIT OF THE TRANSFORMED MESSAGE, GENERATE A RANDOM VECTOR OF INTEGERS SUCH THAT A PROJECTION OF THE VECTOR ONTO A SECRET KEY MAPS TO A VALUE OF THE BIT", where the encryption/decryption module 426 may generate sets of random numbers and determine if they meet the condition defined in Equations [1] and [2]. Unused random number sets may be stored for subsequent use in other encryptions.

Block 528 may be followed by block 530, "TRANSMIT A RANDOM VECTOR FOR EACH BIT OF THE TRANSFORMED) MESSAGE TO THE RECIPIENT", where the encryption/decryption module 426 may transmit the random vector to the recipient who may perform a reverse process restoring the encrypted message.

Figure 6:
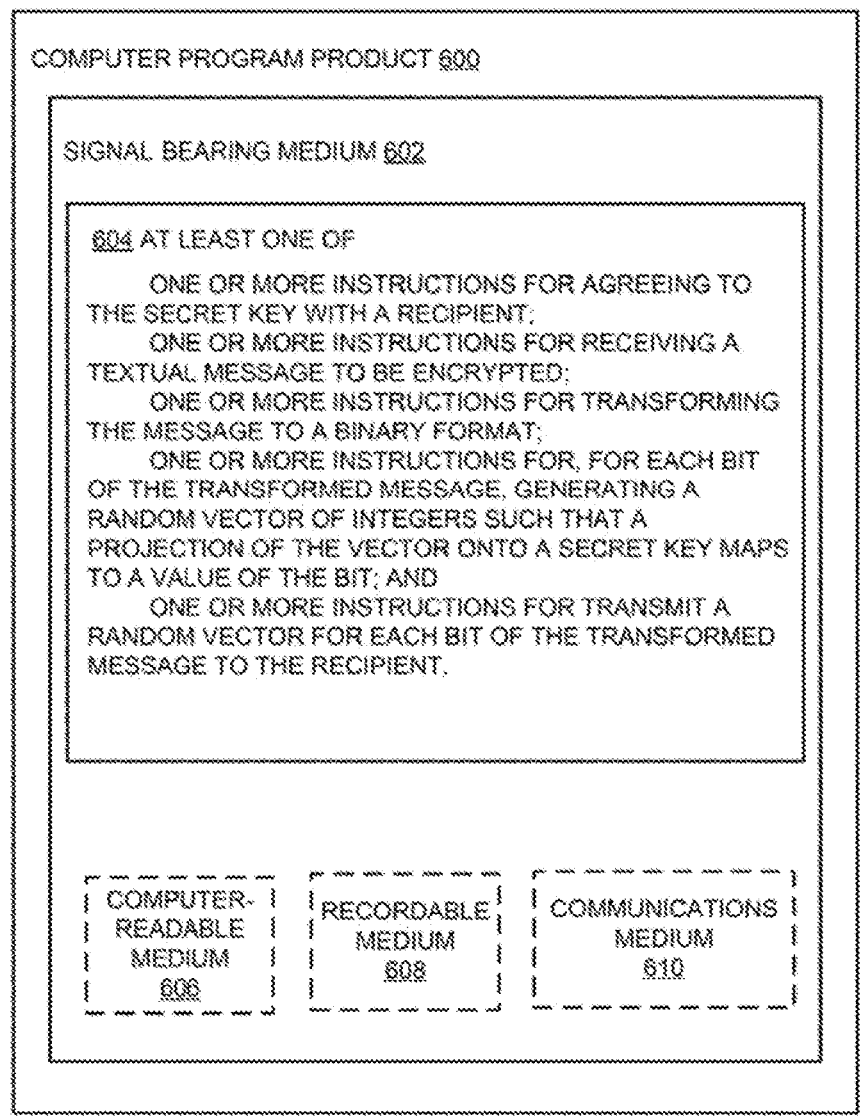
FIG. 6 illustrates a block diagram of an example computer program product, all arranged in accordance with at least some embodiments described herein.

FIG. 6 illustrates a block diagram of an example computer program product, arranged in accordance with at least some embodiments described herein.

In some examples, as shown in FIG. 6, the computer program product 600 may include a signal bearing medium 602 that may also include one or more machine readable instructions 604 that, when executed by, for example, a processor, may provide the functionality described herein. Thus, for example, referring to the processor 404 in FIG. 4, the encryption/decryption module 426 may undertake one or more of the tasks shown in FIG. 6 in response to the instructions 604 conveyed to the processor 404 by the medium 602 to perform actions associated with rapid data encryption and decryption for secure communication with plausible deniability as described herein. Some of those instructions may include, for example, agreeing to the secret key with a recipient; receiving a textual message to be encrypted; transforming the message to a binary format; for each bit of the transformed message, generating a random vector of integers such that a projection of the vector onto a secret key maps to a value of the bit; and/or transmitting a random vector for each bit of the transformed message to the recipient, according to some embodiments described herein.

In some implementations, the signal bearing medium 602 depicted in FIG. 6 may encompass a computer-readable medium 606, such as, but not limited to, a hard disk drive, a solid state drive, a Compact Disc (CD), a Digital Versatile Disk (DVI)), a digital tape, memory, etc. In some implementations, the signal bearing medium 602 may encompass a recordable medium 608, such as, but not limited to, memory, read/write (R/W) CDs, R/W DVDs, etc. In some implementations, the signal bearing medium 602 may encompass a communications medium 610, such as, but not limited to, a digital and/or an analog communication medium (for example, a fiber optic cable, a waveguide, a wired communications link, a wireless communication link, etc.). Thus, for example, the program product 600 may be conveyed to one or more modules of the processor 604 by an RF signal bearing medium, where the signal bearing medium 602 is conveyed by the wireless communications medium 610 (for example, a wireless communications medium conforming with the IEEE 802.11 standard).

According to some examples, methods for secure communication with plausible deniability are described. An example method may include receiving a textual message to be encrypted; transforming the message to a binary format; for each bit of the transformed message, generating a random vector of integers such that a projection of the vector onto a secret key maps to a value of the bit; and/or transmitting a random vector for each bit of the transformed message to a recipient.

According to other examples, the method may further include agreeing to the secret key with the recipient in advance of receiving the message. Transforming the message to a binary format may include concatenating one of ASCII values, text, and binary values. The method may also include reusing the secret key for multiple encryptions. The method may further include determining the projection by computing a scalar product of the random vector with the key for each bit, computing a sign function of a resulting scalar value, and taking an average value of a sum of the sign function and 1.

According to further examples generating the random vector of integers may include generating the integers in decimal format using a pseudo-random number generator (PRNG) such that if the bit to be encrypted is '0', then $S(\vec{a}, \vec{x})=0$ and if the bit to be encrypted is '1', then $S(\vec{a}, \vec{x})=1$, where $\vec{a}$ is a vector representing secret key values and $\vec{x}$ is a vector representing the generated random numbers. The method may also include using two queues to store pseudo-random number sets corresponding to '0' and '1' and filling the queues for subsequent extraction of random vectors.

According to yet other examples, the method may include encrypting two or more messages of equal length using two different secret keys, selecting a random vector for each bit of the two or more messages that simultaneously satisfies a condition for a projected value being equal to a data value for both message—secret key pairs, and/or agreeing, in advance, on one real and one or more fake secret keys and co-encrypting the message with the real secret key and the one or more fake secret keys into a single ciphertext.

In yet further examples, the fake secret keys may be of mutually exclusive content. The method may include transmitting multiple encrypted messages to multiple recipients using the single ciphertext such that each recipient is enabled to extract a message intended for that recipient using a respective secret key. The multiple encrypted messages may be structured as a layered security system such that different recipients have access to different messages based on their authorization level. The method may also include concatenating binary strings corresponding to each bit of the message into a single long binary string. The method may further include transmitting the random vector to the recipient over an open communication channel. The integers of the random vector may be signed integers, and the secret key may be a symmetric key.

According to other examples, a computing device operable to provide a secure communication with plausible deniability is described. An example computing device may include a memory configured to store instructions, a communication module configured to communicate with one or more computing devices over an open communication channel, and a processing module. The processing module may receive a textual message to be encrypted, transform the message to a binary format, for each bit of the transformed message, generate a random vector of integers such that a projection of the vector onto a secret key maps to a value of the bit, and transmit a random vector for each bit of the transformed message to a recipient using one of the one or more computing devices.

According to some examples, the processing module may agree to the secret key with the recipient in advance of receiving the message. The processing module may be configured to transform the message to a binary format by concatenating one of ASCII values, text, and binary values. The processing module may also reuse the secret key for multiple encryptions. The processing module may be further configured to determine the projection by computing a scalar product of the random vector with the key for each bit, computing a sign function of a resulting scalar value, and taking an average value of a sum of the sign function and 1.

According to further examples, the processing module may be configured to generate the random vector of integers by generating the integers in decimal format using a pseudo-random number generator (PRNG) such that if the bit to be encrypted is '0', then $S(\vec{a}, \vec{x})=0$ and if the bit to be encrypted is '1', then $S(\vec{a}, \vec{x})=1$, where $\vec{a}$ is a vector representing secret key values and $\vec{x}$ is a vector representing the generated random numbers. The processing module may use two queues to store pseudo-random number sets corresponding to '0' and '1' and fill the queues for subsequent extraction of random vectors.

According to yet other examples, the processing module may encrypt two or more messages of equal length using two different secret keys, select a random vector for each bit of the two or more messages that simultaneously satisfies a condition for a projected value being equal to a data value for both message—secret key pairs, and/or agree with one or more recipients, in advance, on one real and one or more fake secret keys and co-encrypt the message with the real secret key and the one or more fake secret keys into a single ciphertext. The fake secret keys may encrypt messages of mutually exclusive content.

According to yet further examples, the processing module may be further configured to transmit multiple encrypted messages to the one or more recipients using the single ciphertext such that each recipient is enabled to extract a message intended for that recipient using a respective secret key. The multiple encrypted messages may be structured as a layered security system such that different recipients have access to different messages based on their authorization level. The processing module may also concatenate binary strings corresponding to each bit of the message into a single long binary string and/or transmit it to the recipient over an open communication channel. The integers of the random vector may be signed integers. The secret key is a symmetric key.

According to some examples, a computer readable storage medium with instructions stored thereon, which when executed on one or more computing devices execute a method for providing rapid data encryption and decryption for secure communication with plausible deniability, is described. An example method may include the actions described above.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example, as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular hardware and/or software implementations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, a solid state drive, etc.; and a transmission type medium such as a digital and/or an analog communication medium (for example, a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (for example, feedback for sensing position and/or velocity of gantry systems; control motors for moving and/or adjusting components and/or quantities).

A system may be implemented using any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method executed on a computing device to securely transmit messages, the method comprising:
   enabling the computing device to determine a first encryption key and a second encryption key to be used for message encryption when the computing device is to communicate a first message and a second message to another computing device over an one communication channel;
   after a determination that a length of the first message and a length of the second message are different, altering the length of one of the first message and the second message such that the length of the first message and the length of the second message are same;
   encrypting the first message with the first encryption key to generate a first ciphertext;
   encrypting the second message with the second encryption key to generate a second ciphertext, wherein the second ciphertext is identical to the first ciphertext; and transmitting, to the another computing device and through a communication interface of the computing device, the encrypted first message and the encrypted second message based on the first ciphertext.

2. The method of claim 1, wherein the first message is a sub-message of the second message.

3. The method of claim 1, wherein the first message and the second message are sub-messages of a third message.

4. The method of claim 1, further comprising:
encrypting a third message with a third encryption key to generate a third ciphertext, wherein the third ciphertext is identical to the first ciphertext, and wherein the first message, the second message, and the third message are sub-messages of a fourth message.

5. The method of claim 4, wherein the first ciphertext is decryptable by a first decryption key to extract the first message, by a second decryption key to extract the second message, and by a third decryption key to extract the third message.

6. The method of claim 5, further comprising:
transmitting, over the open communication channel, the first ciphertext to the another computing device and one or more additional computing devices in communication with the computing device such that each computing device is enabled to extract messages intended for each computing device from the first ciphertext based on one or more respective decryption keys assigned to each computing device.

7. The method of claim 6, wherein the one or more respective decryption keys assigned to each computing device are based on an authorization level of each computing device, and include at least one of the first decryption key, the second decryption key, and the third decryption key.

8. The method of claim 7, wherein the computing device has a highest authorization level and is assigned the first decryption key, the second decryption key, and the third decryption key such that the computing, device is enabled to extract the first message, the second message, and the third message from the first ciphertext.

9. The method of claim 7, wherein the another computing device has a lowest authorization level and is assigned the first decryption key such that the another computing device is enabled to extract the first message from the first ciphertext.

10. The method of claim 1, wherein altering the length of one of the first message and the second message such that the length of the first message and the length of the second message are the same comprises:
determining which message between the first message and the second message is of shorter length; and
adding predefined characters to the message determined to be of the shorter length until the first message and the second message are of same length.

11. A computing device to securely transmit messages, the computing device comprising:
a memory configured to store one or more instructions; and
a processor coupled to the memory and configured to execute a communication application in conjunction with the one or more instructions, the communication application comprising:
a communication interface configured to facilitate transmission of one or more encrypted messages over an open communication channel to another computing device; and
an encryption module configured to;
enable the computing device to determine a first encryption key and a second encryption key to be used for message encryption when the computing device is to communicate a first message and a second message to the another computing device over the open communication channel;
after a determination that a length of the first message and a length of the second message are different, alter the length of one of the first message and the second message such that the length of the first message and the length of the second message are same;
encrypt the first message with the first encryption key to generate a first ciphertext; and
encrypt the second message with the second encryption key to generate a second ciphertext, wherein the second ciphertext is identical to the first ciphertext, and wherein the encrypted first and second messages are transmitted through the communication interface based on the first ciphertext.

12. The computing device of claim 11, wherein the communication application further comprises a decryption module, the decryption module configured to:
decrypt the first ciphertext by a first decryption key to extract the first message; and
decrypt the first ciphertext by a second decryption key to extract the second message.

13. The computing device of claim 11, wherein the communication application is further configured to:
concatenate binary strings that correspond to each bit of the first message into a first single long binary string to generate the first ciphertext; and
concatenate binary strings that correspond to each bit of the second message into a second single long binary string to generate the second ciphertext.

14. The computing device of claim 11, wherein the first encryption key and the second encryption key are symmetric keys.

15. The computing device of claim 11, wherein the computing device includes a device associated with a communicating party that is to transmit the one or more encrypted messages to at least one other communicating party over the open communication channel.

16. The computing device of claim 11, wherein the computing device includes a server associated with a third party communication service that is communicatively coupled to two or more communicating parties that are to communicate messages to one another over the open communication channel.

17. A method executed on a computing device to securely transmit messages, the method comprising:
enabling the computing device to determine a respective encryption key to be used for message encryption when the computing device is to communicate a plurality of messages to another computing device over an open communication channel;
receiving the plurality of messages for encryption;
after a determination that a length of a first message and a length of a second message are different, altering the length of one of the first message and the second message such that the length of the first message and the length of the second message are same;
encrypting each of the plurality of messages with the respective encryption key to generate a ciphertext, wherein each generated ciphertext is identical; and transmitting, to the another computing device and through a communication interface of the computing device, one or more of the encrypted messages based on the generated ciphertext.

18. The method of claim 17, wherein encrypting each of the plurality of messages with the respective encryption key to generate the ciphertext comprises:
transforming each of the plurality of messages to a binary format; and
for each of the transformed plurality of messages, generating a random vector of integers for each bit such that a projection of the random vector onto the respective encryption key maps to a value of the bit.

19. The method of claim 18, wherein transforming each of the plurality of messages to the binary format comprises:
concatenating one of ASCII values, text values, and binary values.

20. The method of claim 18, further comprising:
determining the projection of the random vector onto the respective encryption key by computing a scalar product of the random vector with the respective encryption key for each bit, computing a sign function of a resulting scalar value, and taking an average value of a sum of the sign function and 1.

21. The method of claim 18, wherein generating the random vector of integers comprises:
generating the integers in decimal format using a pseudo-random number generator (PRNG) such that if a bit to be encrypted is '0', then $S(\vec{a}, \vec{x})=0$ and such that if the bit to be encrypted is '1', then $S(\vec{a}, \vec{x})=1$, wherein $\vec{a}$ is a vector representing values of the respective encryption key and $\vec{x}$ is a vector representing the generated integers.

22. The method of claim 17, further comprising:
co-encrypting each of the plurality of messages with the respective encryption key and one or more fake encryption keys, wherein the one or more fake encryption keys encrypt messages of mutually exclusive content.

* * * * *

UNITED STATES PATENT AND TRADEMARK OFFICE
CERTIFICATE OF CORRECTION

PATENT NO.         : 9,621,521 B2                                    Page 1 of 1
APPLICATION NO.    : 14/796238
DATED              : April 11, 2017
INVENTOR(S)        : Davydov It is certified that error appears in the above-identified patent and that said Letters Patent is hereby corrected as shown below:

In the Specification

In Column 1, Line 10, delete "§120" and insert -- § 120 --, therefor.

In Column 1, Line 13, delete "§371" and insert -- § 371 --, therefor.

In Column 6, Line 56, delete "1100111," and insert -- 11001111, --, therefor.

In Column 10, Line 9, delete "(120 bits)." and insert -- (1120 bits). --, therefor.

In Column 13, Line 9, delete "FORMED)" and insert -- FORMED --, therefor.

In Column 13, Line 40, delete "(DVI))," and insert -- (DVD), --, therefor.

In the Claims

In Column 18, Line 56, in Claim 1, delete "one" and insert -- open --, therefor.

In Column 19, Line 38, in Claim 8, delete "computing, device" and insert -- computing device --, therefor.

In Column 19, Line 67, in Claim 11, delete "to;" and insert -- to: --, therefor.

Signed and Sealed this
Eighth Day of August, 2017

Joseph Matal
*Performing the Functions and Duties of the
Under Secretary of Commerce for Intellectual Property and
Director of the United States Patent and Trademark Office*